(12) United States Patent
Yamada

(10) Patent No.: US 7,680,589 B2
(45) Date of Patent: Mar. 16, 2010

(54) IN-VEHICLE NAVIGATION APPARATUS

(75) Inventor: Wako Yamada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 11/984,575

(22) Filed: Nov. 20, 2007

(65) Prior Publication Data

US 2008/0120030 A1 May 22, 2008

(30) Foreign Application Priority Data

Nov. 22, 2006 (JP) ............................. 2006-316136

(51) Int. Cl.
*G01C 21/00* (2006.01)
(52) U.S. Cl. ..................................... 701/200
(58) Field of Classification Search ......... 701/200–202, 701/207–209, 213; 340/988–993, 995.1, 340/995.12–995.14, 995.19
See application file for complete search history.

(56) References Cited

U.S. PATENT DOCUMENTS

| 6,898,519 | B1 | 5/2005 | Schilling | |
|---|---|---|---|---|
| 2001/0027373 | A1* | 10/2001 | Bates et al. | 701/117 |

FOREIGN PATENT DOCUMENTS

| DE | 197 25 075 A1 | 12/1998 |
|---|---|---|
| DE | 101 13 736 A1 | 10/2002 |
| JP | A-2005-173909 | 6/2005 |
| JP | A-2006-052973 | 2/2006 |
| JP | A-2006-250946 | 9/2006 |

OTHER PUBLICATIONS

Office Action mailed Nov. 6, 2009 issued by the German Patent and Trademark Office in corresponding German patent application No. 10 2007 055 208.6 - 31 (English translation enclosed).

* cited by examiner

*Primary Examiner*—Kim T Nguyen
(74) *Attorney, Agent, or Firm*—Posz Law Group, PLC

(57) ABSTRACT

An in-vehicle navigation apparatus includes the following: a master road regulation data table which stores a master road regulation data to be associated with road segments as applied targets; a temporary road regulation data table, which is prepared apart from the master road regulation table and stores temporary road regulation data to be associated with road segments and applied in preference to the master road regulation data; and a data determination unit which determines with respect to each road segment an application of either the master road regulation data or temporary road regulation data based on reference information for determining road regulation data validity. The determined road regulation data is outputted.

17 Claims, 14 Drawing Sheets

ROAD REGULATION DATA TABLE 21d1

MASTER TB1

| ROAD | SEGMENT | CONTENT |
|---|---|---|
| NATIONAL Q. | CITY R | 50km/H |
| PREFEC. S | TOWN T – TOWN U | 40km/H |
| ⋮ | ⋮ | ⋮ |

TEMPORARY TB2

| ROAD | SEGMENT | CONTENT | PERIOD | HOURS |
|---|---|---|---|---|
| NATIONAL Q. | PEAK W | ALTERNATE TRAFFIC | UNTIL RECOVERY | 00:00-24:00 |
| PREFEC. S | TOWN T – TOWN U | 30km/H | FROM DATE X TO DATE Y | 10:00-16:00 |
| ⋮ | ⋮ | ⋮ | ⋮ | ⋮ |

ADDITIONAL TB3

| ROAD | SEGMENT | CONTENT | PERIOD | HOURS |
|---|---|---|---|---|
| NATIONAL X. | CROSS Y | LEFT-TURN | – | 15:00-20:00 |
| PREFEC. Z | TOWN M – TOWN N | AVOID PASS | – | 22:00-06:00 |
| ⋮ | ⋮ | ⋮ | ⋮ | ⋮ |

PHONE BOOK 21d2

FIG. 5A

USER DATA DESIGNATION

TEMPORARY ROAD REGULATION DATA

ADDITIONAL DATA

ENTER    RETURN

FIG. 5B

TEMPORARY ROAD REGULATION DATA INPUT

SEGMENT
CONTENT
PERIOD
HOURS

ENTER    RETURN

FIG. 5C

TEMPORARY ROAD REGULATION DATA INPUT

SEGMENT   C TO D
CONTENT   NO TRAFFIC
PERIOD    SEPTEMBER 1, 2006 TO SEPTEMBER 29, 2006
HOURS     22:00 TO 06:00

ENTER    RETURN

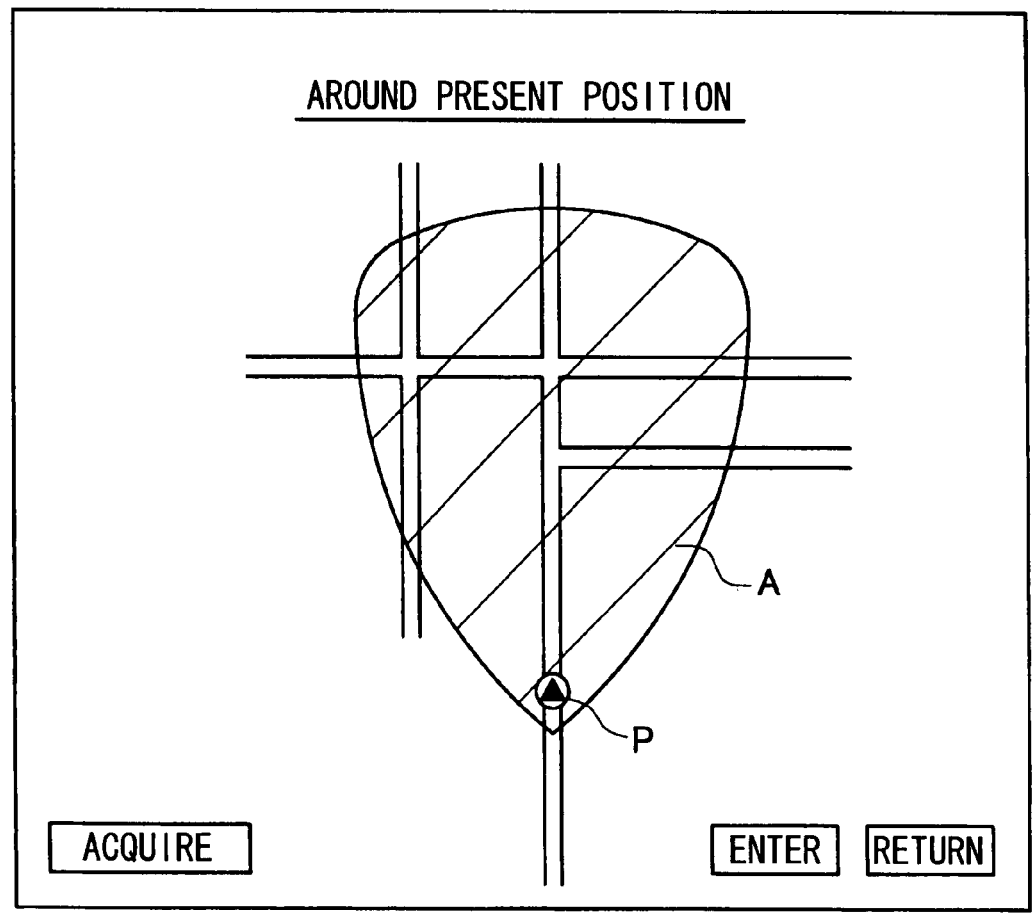

IN-VEHICLE NAVIGATION APPARATUS

CROSS REFERENCE TO RELATED APPLICATION

This application is based on and incorporates herein by reference Japanese Patent Application No. 2006-316136 filed on Nov. 22, 2006.

FIELD OF THE INVENTION

The present invention relates to an in-vehicle navigation apparatus.

BACKGROUND OF THE INVENTION

An in-vehicle navigation apparatus contributes to a user's efficient and safe operation. For instance, the apparatus detects a present position using GPS (Global Positioning System) etc. as the vehicle travels, and displays the detected present position on a road map. The apparatus further designates a optimum route from a departure point to a destination, and guides the vehicle along the guide route via a display device, audio output device, or the like.

The navigation apparatus has several functions other than a route guide function. For example, traffic regulation information about travel roads of the vehicle is acquired based on present positions; changes of traffic regulation information are informed a driver; a vehicle speed is controlled based on static information such as a speed limit or halt sign; and vehicle controls are varied based on dynamic information such as road surface conditions (refer to Patent document 1).

Patent document 1: JP-2005-173909 A

Moreover, another navigation apparatus has a function to provide regulation information such as a speed limit using regulation data previously stored in memory as a map database when approaching or passing through a corresponding road.

In Patent document 1, traffic regulation information such as a speed limit is stored as follows: the information may be stored as a database to be associated with map data in an in-vehicle or detachable storage medium (e.g., CD-ROM, DVD-ROM); or the information as the database may be received from an outside of the vehicle via vehicle-to-vehicle communications or vehicle-to-road communications and appropriately updated using difference data received via the communications. In other words, the information as the database thus needs to be constantly updated to newest data.

For example, the updated regulation information may be temporarily valid for a predetermined validity period and be not updated again after the validity period expires. In this case, the vehicle speed is controlled based on the inappropriate regulation information.

Moreover, in a conventional in-vehicle navigation apparatus, if regulation information is changed, a user may manually change set points or values. However, when usual regulation information is changed temporarily because of road state changes due to weather or road construction, it is troublesome for a user to change set points to follow the changed information without fail. For instance, if the changed information is valid for a limited time period, cautious operations are needed. If the cautious operations are impossible, the original information is reluctantly maintained without being changed. The driver has no other choice to drive the vehicle according to actual traffic regulations.

SUMMARY OF THE INVENTION

It is an object of the present invention to provide an in-vehicle navigation apparatus with functions to provide guides for safety speeds or road regulations applied to real road states.

According to an example of the present invention, a navigation apparatus for a vehicle is provided as follows. A road map data storage unit is configured to store road map data. A road regulation data storage unit is configured to store master road regulation data table and temporary road regulation data table. The master road regulation data table includes master road regulation data to be associated with road segments in the road map data. The temporary road regulation data table is independent from the master road regulation data table and includes temporary road regulation data to be associated with a predetermined road segment included in the road segments. The temporary road regulation data is applied in preference to the master road regulation data. A reference information acquisition unit is configured to acquire reference information for determining which of the master road regulation data and the temporary road regulation data is valid with respect to one of the road segments as a target road segment. A data determination unit is configured to determine an application of either the master road regulation data or the temporary road regulation data to the target road segment based on the acquired reference information. A road regulation data output unit is configured to output either the master road regulation data or the temporary road regulation data of which the application is determined.

According to another example of the present invention, a method is provided for determining an application of road regulation data using road map data for a vehicle. The method comprises: (i) storing master road regulation data to be associated with road segments in the road map data; (ii) storing the temporary road regulation data to be associated with a predetermined road segment included in the road segments, the temporary road regulation data being applied in preference to the master road regulation data; (iii) acquiring reference information for determining which of the master road regulation data and the temporary road regulation data is valid with respect to one of the road segments as a target road segment; and (iv) determining an application of either the master road regulation data or the temporary road regulation data to the target road segment based on the acquired reference information.

BRIEF DESCRIPTION OF THE DRAWINGS

The above and other objects, features, and advantages of the present invention will become more apparent from the following detailed description made with reference to the accompanying drawings. In the drawings:

FIG. 3 is a diagram illustrating an example of a configuration of a database;

FIG. 5A is a view illustrating an example of a display window for user data designation;

FIG. 5B is a view illustrating an example of a display window for temporary road regulation data input;

FIG. 5C is a view illustrating an example of a display window for a result of the temporary road regulation input;

FIG. 7 is a view illustrating an example of a display window for temporary road regulation data acquisition area designation;

FIG. 8 is a view illustrating an example of a display window indicating that temporary road regulation data acquisition area is designated in a proximity of a present position;

FIG. 11 is a flow chart of a road regulation data table reference process;

DETAILED DESCRIPTION OF THE PREFERRED EMBODIMENTS

Figure 1:
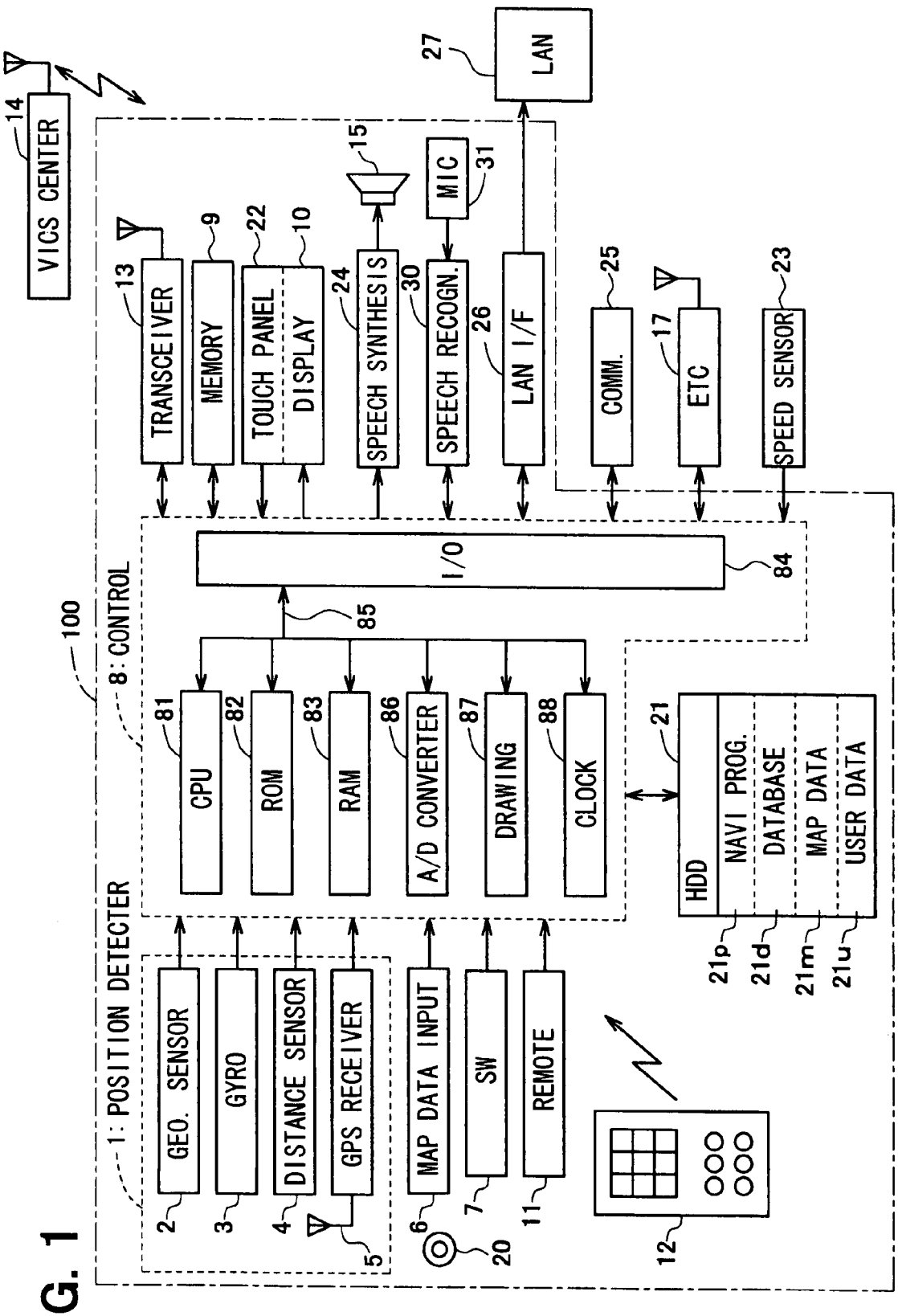
FIG. 1 is a block diagram illustrating a configuration of an in-vehicle navigation apparatus according to an embodiment of the present invention.

An in-vehicle navigation apparatus according to an embodiment of the present invention will be explained, with reference to drawings. FIG. 1 is a block diagram illustrating a configuration of an in-vehicle navigation apparatus 100 mounted in a subject vehicle 101.

The navigation apparatus 100 includes the followings: a position detection unit 1; a map data input unit 6; an operation switch group 7; a remote control sensor 11; a speech synthesis circuit 24 for audio assist etc.; a speaker 15; a memory device 9; a display unit 10; a transceiver 13; a HDD (Hard disk drive) 21; a LAN (Local Area Network) I/F (interface) 26; a control circuit 8 connecting the foregoing components; and a remote control terminal 12.

The position detection unit 1 has known sensors or the like as follows: a geomagnetic sensor 2, a gyroscope 3 for detecting rotation angle speeds of the vehicle 101, a distance sensor 4 for detecting travel distances of the vehicle 101, and a GPS receiver 5 for detecting a present position of the vehicle 101 based on electric waves from satellites. The individual sensors or the like 2 to 5 have types of detection errors different from each other; therefore, they are used to complement each other. In addition, only part of the sensors can be included depending on detection accuracy requirement. Furthermore, another sensor can be additionally or alternatively included such as a rotation sensor of steering, a wheel sensor of each following wheel, or a speed sensor 23.

The operation switch group 7 includes mechanical switches or touch panel 22 integrated with the display unit 10, for example. In the touch panel 22, a glass substrate and a transparent film are provided with a clearance ("spacer") on the screen of the display unit 10; thus, an electrical circuit is wired in an X axial direction and a Y axial direction. When a user touches a top of the film, wiring of the touched portion short-circuits and a pressure value changes. The pressure value is detected as a two-dimensional coordinate value (X, Y). The above is called a resistance film system, which is used widely. In addition, a well-known electrostatic capacity method can be also used. A pointing device other than the mechanical switch such as a mouse and a cursor may be also used. Moreover, the mechanical switch of the operation switch group 7 may be arranged in a cosmetic frame surrounding the periphery of the display unit 10.

Moreover, it is also possible to input various instructions using a microphone 31 and a speech recognition unit 30. This process, i.e., speech recognition technology uses a well-known hidden Markov model. In the speech recognition unit 30, audio signals inputted from the microphone 31 are processed and changed into an operation command according to the processing result. Thus, the operation switch group 7, the remote control terminal 12, the touch panel 22, or the microphone 31 can be used for various inputs such as inputting temporary road regulation data or designating temporary road regulation data acquisition area.

Figure 2:
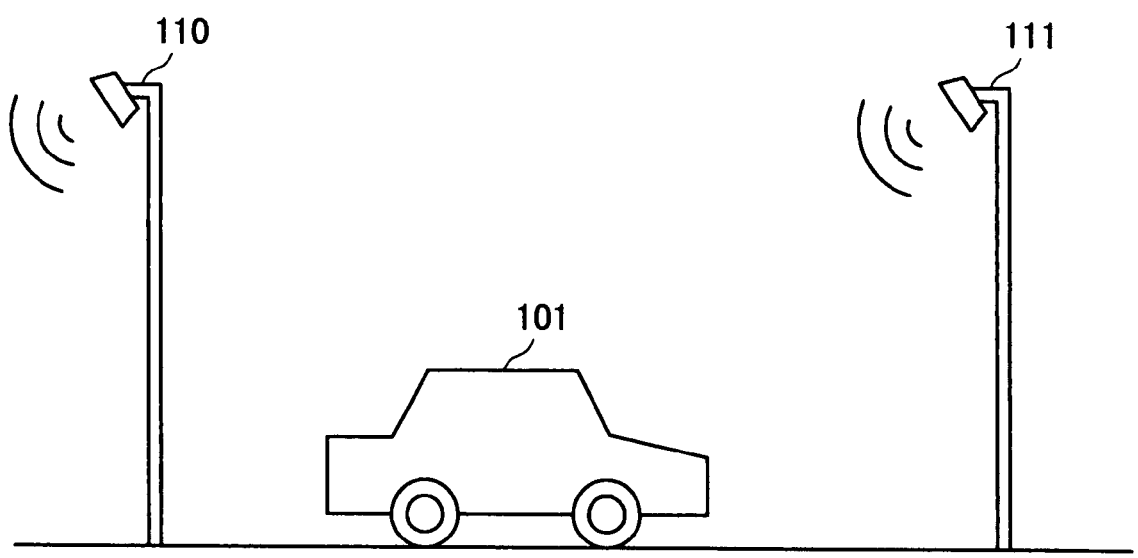
FIG. 2 is a view illustrating an example of receiving temporary road regulation data via transmitters along a road.

The transceiver 13 receives road traffic information from a VICS center 14 (VICS: Vehicle Information and Communication System, registered trademark) using light beacons or electric wave beacons outputted from transmitters 110,111 (refer to FIG. 2) along a road. The transceiver 13 further receives FM multiplex broadcast. Moreover, the transceiver 13 can be designed to connect with external networks such as the Internet. Furthermore, the transceiver 13 may be designed to communicate with another traffic information distribution system such as U.S. satellite radio or European RDS-TMC (Radio Data System-Traffic Message Channel) which uses radio broadcasting.

Moreover, the control circuit 8 may be connected with an in-vehicle ETC unit 17 (ETC: Electronic Toll Collection System). The ETC unit 17 communicates with a roadside unit (not illustrated) for the navigation apparatus 100 to acquire information such as a toll. Moreover, the in-vehicle ETC unit 17 may be designed to connect with an external network to thereby communicate with the VICS Center 14 or the like. The in-vehicle ETC unit 17 uses a well-known DSRC (Dedicated Short Range Communication) technology. Another in-vehicle communication unit compliant with the DSRC technology may be provided to communicate with external networks.

The control circuit 8 may be a usual computer having a CPU 81, a ROM 82, a RAM 83, an I/O (Input/Output) unit 84, an A/D (Analog/Digital) conversion unit 86, a drawing unit 87, a clock IC 88, and a bus line 85 connecting the foregoing components. The CPU 81 controls using a navigation program 21p and data stored in the HDD 21. The control of data read/write with the HDD 21 is performed by the CPU 81. To anticipate uncontrollable state in the data read/write between the CPU 81 and the HDD 21, a program for the navigation apparatus 100 to perform necessary minimum operation may be stored in the ROM 82. Herein, the control circuit 8 functions as a means or unit to acquire reference information for determining road regulation data validity, determine road regulation data, acquire a present date and time, and retrieve a guide route.

The A/D conversion unit 86 contains a well-known A/D (analog/digital) conversion circuit. For example, analog data inputted from the position detection unit 1 etc. into the control circuit 8 are changed into digital data processed by the CPU 81.

The drawing unit 87 generates data for drawing display windows in the display unit 10 from display data, display color data, or map data 21m stored in the HDD 21 or the like.

The clock IC 88, which is called a real-time clock IC, sends out or designates data of a clock and calendar (date and time information) upon receiving demands from the CPU 81. The CPU 81 acquires the date and time information from the clock IC 88. Moreover, the date and time information can be also acquired from GPS signals received by the GPS receiver 5. Moreover, the date and time information can be generated based on a real time counter contained in the CPU 81.

The HDD 21 stores data for map matching to improve position detection accuracy and map data 21*m* as a map database including road map data indicating road connections in addition to the navigation program 21*p*. The map data 21*m* further stores road network information including link data, node data, etc. and predetermined map image information used for display. The link data are information on predetermined road segments constituting each road and include position coordinates, distances, travel times, road widths, the numbers of lanes, speed limits, and the like.

Node data are information on intersections (e.g., branching points) and include position coordinates, the numbers of lanes for right/left turn, road links connected therewith, information on connection between links, and the like. The information on connection between links include data indicating whether traffic is permitted or unpermitted. Herein, the map data 21*m* functions as a means or unit to store road map data.

The HDD 21 further stores supplementary information for route retrieval, amusement information, and user data 21*u*, which are inputted optionally by a user in a predetermined area. Moreover, the HDD 21 stores data needed for operating the navigation apparatus 100 and a variety of information as a database 21*d*.

The navigation program 21*p*, map data 21*m*, user data 21*u*, and database 21*d* can be updated (e.g., addition, revision) via the map data input unit 6 from a storage medium 20. The storage medium 20 includes a CD-ROM or DVD because of required data capacity; another medium such as a memory card may be included. Data stored in the HDD 21 can be acquired (e.g., downloaded) via external networks instead of acquiring data from the storage medium 20.

The memory device 9 includes a rewritable device such as an EEPROM (Electrically Erasable & Programmable Read Only Memory) or flash memory. In the memory device 9, information needed for operating the navigation apparatus 100. In addition, the memory device 9 holds data stored therein even if the navigation apparatus 100 is turned off. The information needed for operating the navigation apparatus 100 can be stored in the HDD 21 instead of the memory device 9. The information needed for operating the navigation apparatus 100 can be divided to be stored in the memory device 9 and the HDD 21.

The display unit 10 can be a well-known color liquid crystal display unit, which includes a dot matrix LCD (Liquid Crystal Display) and a driver circuit (not shown) for controlling the LCD display. For example, the driver circuit uses an active matrix drive system, in which a transistor is attached for each pixel and a target pixel can be securely turned on or off. Display is performed based on a display instruction and display window data which are sent from the control circuit 8. Moreover, the display unit 10 may be an organic EL (Electro Luminescence) display unit or a plasma display unit. Herein, the display unit 10 functions as a means or unit to output road regulation data.

The speaker 15 outputs analog sounds into which digital audio data stored in the memory device 9 or HDD 21 are converted based on an instruction of the navigation program 21*p* in a well-known speech synthesis circuit 24. The speech synthesis includes a recording edit system and a text synthesis system. In the recording edit system, sound waveforms are accumulated as it is or coded and connected as needed. In the text synthesis system, sounds are synthesized from character input information to correspond thereto. Herein, the speaker 15 functions as a means or unit to output road regulation data.

The speed sensor 23 includes a rotation detection unit such as a well-known rotary encoder, and detects rotation of a wheel near a wheel installation unit. The detected rotation is sent to the control circuit 8 as a pulse signal. The control circuit 8 converts the rotation of the wheel into a speed of the vehicle 101 to thereby calculate an estimated travel time from a present position of the vehicle 101 to a predetermined place or an average vehicle speed for every travel road section.

The communication unit 25 can be a well-known wireless terminal and used to communicate data with an external network. The communication unit 25 can be an interface circuit to communicate data between the control circuit 8 and a portable communication terminal (not shown) such as a cellular phone. Moreover, the communication unit 25 can be designed to be acquirable of a variety of information from an information center of a traffic information distribution system or be compliant with the DSRC technology. Herein, the communication unit 25 functions as a means or unit to acquire temporary road regulation data.

The LAN I/F 26 is an interface circuit for communicating data with another in-vehicle apparatus or a sensor through an in-vehicle LAN 27. Moreover, the LAN I/F 26 can be used to acquire data from the speed sensor 23, or connect with the in-vehicle ETC unit 17.

Under the above configuration of the navigation apparatus 100, the navigation program 21*p* is started by the CPU 81 of the control circuit 8. The user selects a route guide process for displaying a route to a destination from a menu (not shown) displayed in the display unit 10 by the operation switch group 7, the touch panel 22, or the remote control terminal 12, or by speech input via the microphone 31. In this case, the following process takes place.

First, the user retrieves a destination. Destinations can be retrieved by (i) designating a point on a map, (ii) selecting an area including a destination, (iii) using a telephone number, (iv) inputting a destination via a alphabetical list, or (v) using an point stored in the memory device 9 as a frequently used facility. When a destination is designated, a present position of the vehicle 101 is acquired by the position detection unit 1, and an optimal guide route to the destination from the detected present position as a departure point is retrieved. The retrieved guide route is displayed on the road map on the display unit 10 in superimposition, and the vehicle or the user is guided along the guide route. The technique of designating the guide route automatically uses, for instance, the known Dijkstra method. At least either the display unit 10 or the speaker 15 is used to notify the user of operation guides or messages according to an operating state.

FIG. 3 is a diagram illustrating an example of a configuration of a database 21*d*. The database 21*d* further includes a telephone book 21*d*2 in addition to the road regulation data table 21*d*1. The telephone book 21*d*2 is used when retrieving a destination as mentioned above and includes, in addition to telephone numbers, names and positions (e.g., two-dimensional coordinates) of facilities corresponding to the individual telephone numbers.

The road regulation data table 21*d*1 includes a master road regulation data table TB1, a temporary road regulation data table TB2, and an additional data table TB3. The master road regulation data table TB1 is previously stored in the HDD 21 along with the map data 21*m* and includes road regulation data such as speed limits specified to road segments (i.e., links) included in the map data 21*m*.

The temporary road regulation data table TB2 is prepared apart from the master road regulation data table TB1, and stores road regulation data acquired from an outside of the vehicle 101 or road regulation data inputted by the user. The temporary road regulation data include road segments, data contents of regulations, periods of regulations, and hours (e.g., time zones) of regulations. The periods of regulations and the hours of regulations may be defined as temporary road regulation data application period information or reference information for determining road regulation data validity.

The additional data table TB3 is prepared apart or independent from the above two data tables TB1, TB2 and stores data contents inputted by the user. The additional road regulation data include road segments, data contents of regulations, periods of regulations, and hours (e.g., time zones) of regulations. The different point from the temporary road regulation data table TB2 is in that the data contents of regulations can reflect not traffic restrictions based on general regulations but user's preferences. For example, the user has a recognition that it is difficult to turn to the right at Cross Y of National Road X in time zone between 15:00-20:00; thereby, the recognition is stored as additional regulation data (attached data) indicating that only left turn is possible. Moreover, since many vehicles recklessly run at midnights and early mornings (22:00 to 06:00) in many cases, a road segment of Town M to Town N of Prefectural Road Z is stored as a data content of regulation of "Avoid Pass."

Figure 4:
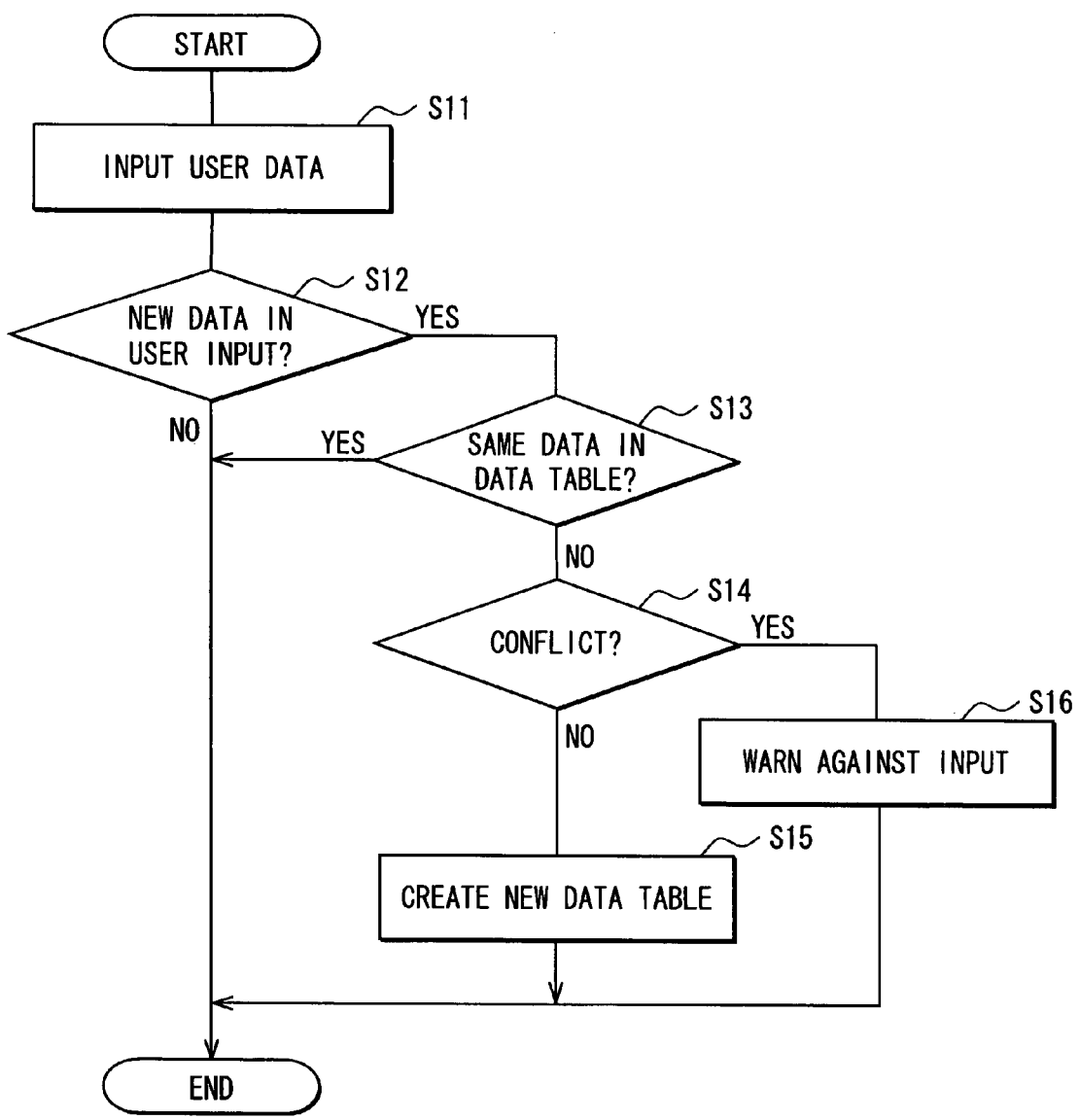
FIG. 4 is a flow chart explaining a temporary road regulation data input process.

A user data input process is explained using FIG. 4. This process is included in the navigation program 21p, and repeatedly executed along with other processes included in the navigation program 21p. First, a user data designation window (e.g., menu) is displayed in the display unit 10 as shown in FIG. 5A based on user's instructions via the operation switch group 7, the touch panel 22, or the remote control terminal 12, or the user's speech input via the microphone 31. When the temporary road regulation data is inputted, "Temporary Road Regulation Data" button and "Enter" button are pressed. When the additional data is inputted, "Additional Data" and "Enter" button are pressed.

FIG. 5B is a display example of a temporary road regulation data input window (e.g., menu) when the temporary road regulation data is selected in FIG. 5A. In this input menu, a segment, a data content of regulation, a period, and hours (e.g., time zone) are inputted with respect to the temporary road regulation taking place (S11). FIG. 5C is an input example of the temporary road regulation data. When the additional road regulation data is selected in FIG. 5A, an input window can be displayed similarly with that in FIG. 5B and an input can be performed similarly with that in FIG. 5C.

When "Enter" button is pressed on the display window in FIG. 5C, the following takes place. It is investigated whether any user data (temporary road regulation data or additional data) inputted by the user is existing in an input data buffer provided in the RAM 83 or the memory device 9. When the same data as the present input data is existing (S12: No), a message of "already inputted" may be displayed on a display screen, for example. The present process is then ended. When no same data as the present input data is not existing (i.e., the present input data is new data (S12: Yes), it is investigated whether the same data as the present input data is already stored with reference to the temporary road regulation data table TB2 or additional data table TB3.

When the same data as the input data is already stored (S13: Yes), the data of the relevant data buffer is cleared and the present process is ended.

In contrast, when the input data is new data (S13: No), it is investigated whether there is any discrepancy (or conflict) between the input data and already stored road regulation data by comparing with each other. When there is a conflict (S14: Yes), a message is outputted via the display unit 10 or the speaker 15 and correction or re-input of the data is requested from the user (S16).

The conflict may exist when the following takes place, for example.

(1) The time zones overlap at least in part and the data contents of regulations differ. For instance, although segments as a target of road regulation are identical, the data content already stored is "a speed limit of 30 km/h between 8:00-18:00" and the data content of the new data is "a speed limit of 40 km/h between 12:00-20:00."

(2) The segments are different at least in part although the data contents of road regulations are identical.

In contrast, when there is no conflict in the data content of road regulation as the result of comparing with other temporary road regulation data stored (S14: No), the data content (i.e., data) is added to the temporary road regulation data table TB2 or additional data table TB3 (S15). The data content of the relevant data buffer is cleared herein.

When the data content of road regulation has a conflict as the result of comparing with other data stored (S14: Yes), correction or re-input may not be requested from the user. Instead, after taking matching between the data, the data can be added to the temporary road regulation data table TB2 or additional data table TB3 as follows:

(1) When the segments and the data contents of regulations are identical but the periods differ from each other, the data inputted later is overwritten.

(2) When the segments and the data contents of regulations are identical but the periods or time zones differ from each other, the data inputted later is prioritized (i.e., overwritten) in the overlapped part and the data remain as it is in the part not overlapping.

(3) When the segments as targets of road regulations overlap at least in part although the data contents of regulations are identical, the data inputted later is prioritized (i.e., overwritten) in the overlapped part and the data remain as it is in the part not overlapping.

Figure 6:
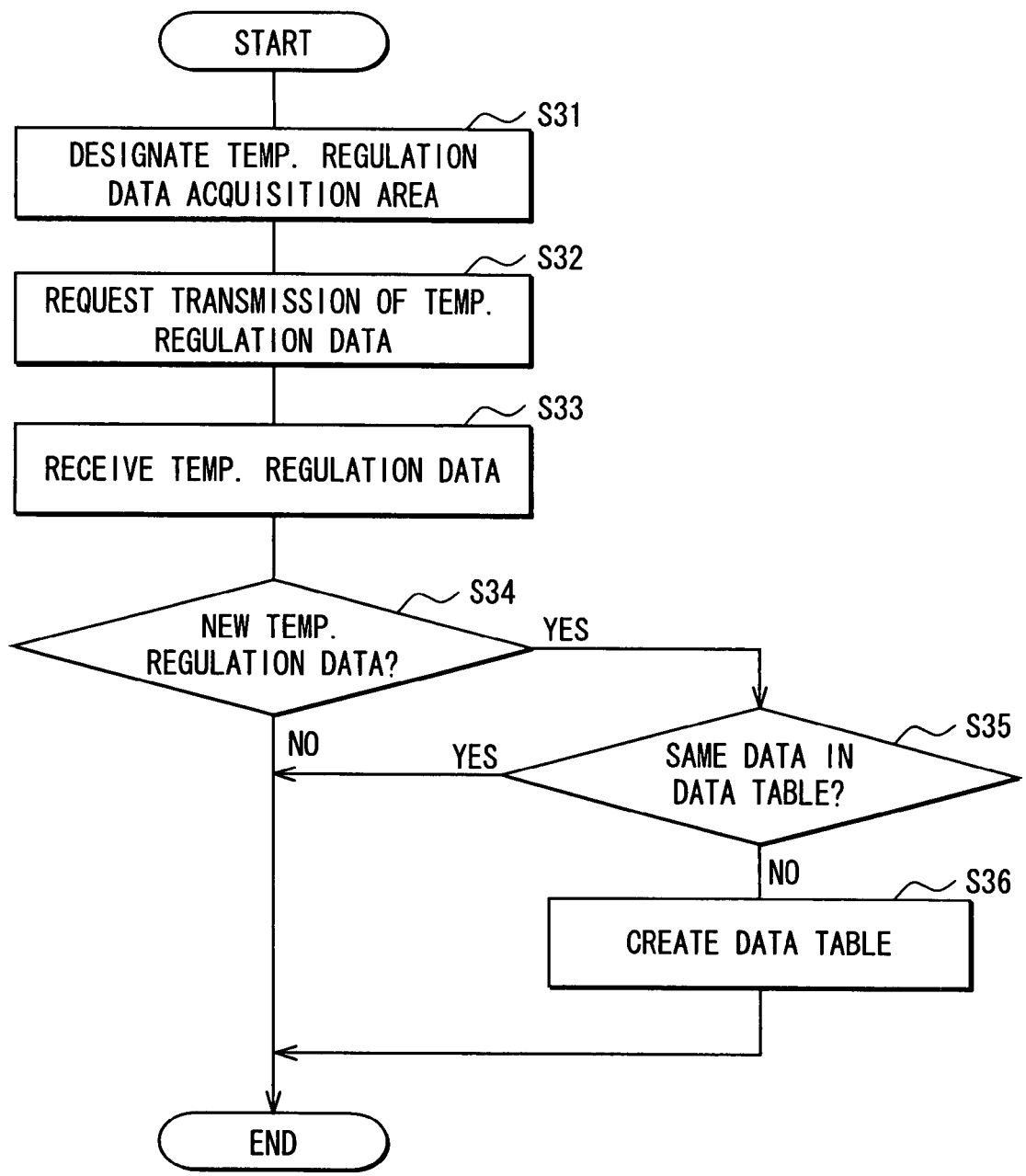
FIG. 6 is a flow chart explaining a temporary road regulation data reception process.

An acquisition process of the temporary road regulation data from an outside of the vehicle is explained using FIG. 6. This process is included in the navigation program 21p, and repeatedly executed along with other processes included in the navigation program 21p. First, an acquisition area for acquiring temporary road regulation data is designated (S31, details are mentioned later). Next, through the communication unit 25, the control circuit 8 connects with an external network, such as the Internet, and accesses a data server 41 (refer to FIG. 14) in the network to request transmission of temporary road regulation data about the corresponding area (S32). Here, an authentication (e.g., user authentication or terminal authentication) may be performed to check for authenticated communication between the terminal (navigation apparatus 100) and the data server 41.

In addition to or instead of the data server 41, an information center of a traffic information distribution system such as the VICS Center 14 may hold temporary road regulation data. In this case, the temporary road regulation data may be acquired via the transmitters 110,111 (refer to FIG. 2).

The temporary road regulation data about the corresponding area can be received from the data server 41 (S33). The received temporary road regulation data is stored in the receive data buffer provided in the RAM 83 or memory device 9.

Next, when new temporary road regulation data is received (S34:Yes) (i.e., when the receive data buffer is not empty (or not in a cleared state)), it is investigated whether the same data as the received temporary road regulation data is already stored with reference to the temporary road regulation data table TB2. When the same data as the received data is already stored (S35: Yes), the data of the relevant data buffer is cleared and the present process is ended.

In contrast, when the received temporary road regulation data is new data (S35: No) (i.e., when the same data does not exist in the temporary road regulation data table TB2), the data content is created and added to the temporary road regulation data table TB2 (S36). The data content of the relevant data buffer is cleared herein.

Like the example of FIG. 4, when the data content of the road regulation data is compared with other temporary road regulation data already stored and has a conflict, a countermeasure may be executed according to the state of the conflict.

The designation of the acquisition area for temporary road regulation data is explained based on examples of display windows in the display unit 10 using FIGS. 7 to 10. First, a user's instruction is issued by an operation via the operation switch group 7, the remote control terminal 12, and the touch panel 22, or by the speech input via the microphone 31. The temporary road regulation data acquisition area designation window is displayed in the display unit 10. As shown in FIG. 7, the temporary road regulation data acquisition area includes the following: (1) an area around a present position, (2) an area along a guide route, and (3) an area specified by users other than the foregoing areas.

When the "Around Present Position" button and the "Enter" button are pressed in this order in FIG. 7, the present position P of the vehicle detected by the position detection unit 1 is displayed in the display unit 10, as shown in FIG. 8. For example, a fan-like shaped area A ahead of the present position P is designated as a temporary road regulation data acquisition area. The temporary road regulation data acquisition area may be shaped of a circle or a rectangle with the present position P centered. When "Enter" button is subsequently pressed, the temporary road regulation data acquisition area is designated. When "Acquire" button is pressed, information on the area A can be acquired.

Figure 9:
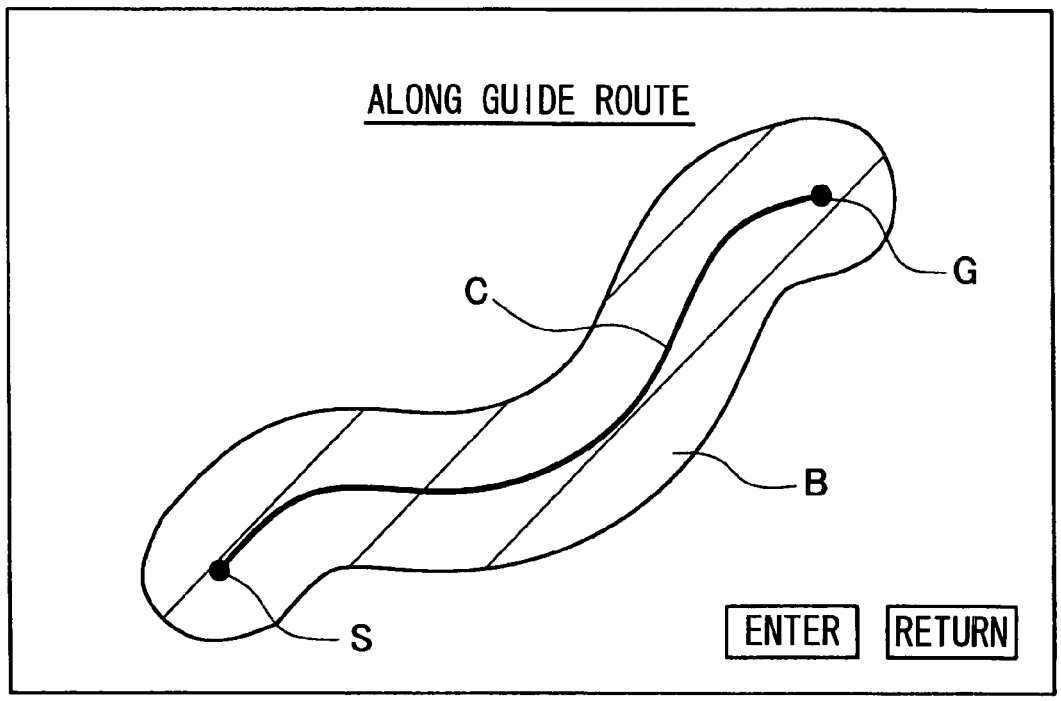
FIG. 9 is a view illustrating an example of a display window indicating that temporary road regulation data acquisition area is designated in a proximity of a guide route.

Moreover, when "Around Present Position" button and "Enter" button are pressed in this order, a departure point (or present position) S, a destination G, and a guide route C are displayed in the display unit 10, as shown in FIG. 9. For example, a temporary road regulation data acquisition area B can be designated to include an area of 5 km radius circle with the departure point S centered, an area of 5 km radius circle with the destination G centered, and an area of 5 km distances from both sides of the guide route C. When "Enter" button is subsequently pressed, the temporary road regulation data acquisition area B is designated.

The request of data transmission can include (i) the temporary road regulation data acquisition area B along the guide route C, or (ii) the departure point S, the destination G, and the guide route C. In the case (ii), the data server 41 is designed to obtain the area B based on the received request.

Figure 10:
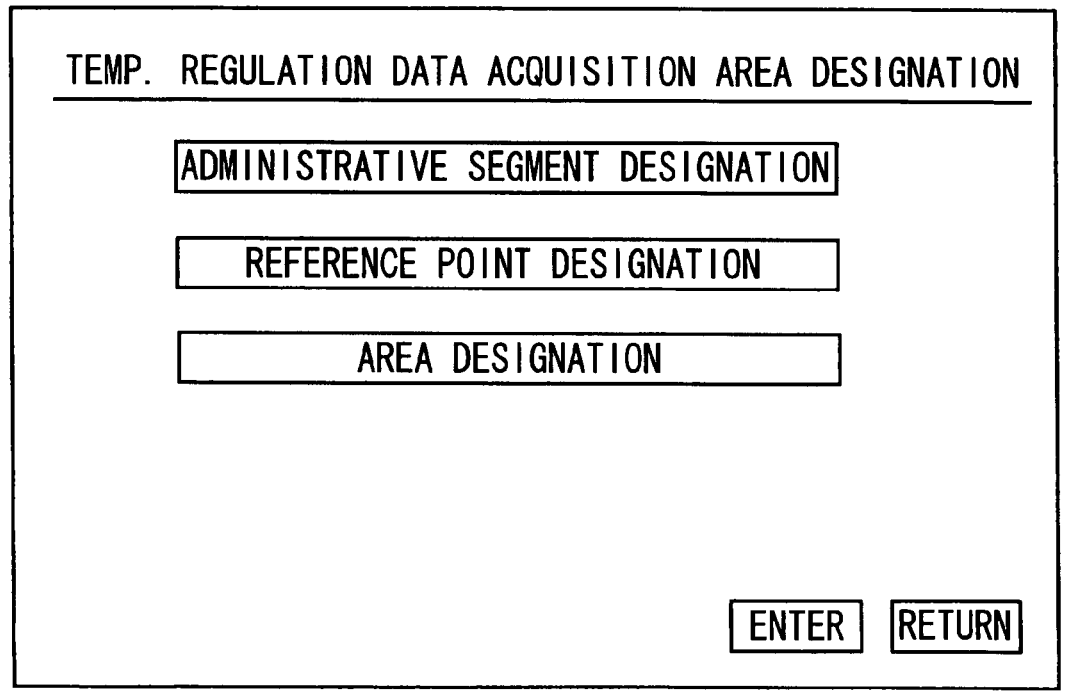
FIG. 10 is a view illustrating an example of a display window for temporary road regulation data acquisition area designation based on an area designated by a user.

Moreover, "User Designation" button and "Enter" button are pressed in this order, the temporary road regulation data acquisition area designation window is displayed in the display unit 10, as shown in FIG. 10. Here, when "Administrative Segment Designation" button is pressed, an alphabet display window or map display window (not shown) is displayed for designating a preferred administrative segment.

Moreover, when "Reference Point Designation" button is pressed, a point or facility as a reference point can be selectable in a manner similar to that for designating a destination in the guide route retrieval. The temporary road regulation data acquisition area may be designated to include an area shaped of a circle or a rectangle with the reference point centered.

Moreover, when "Area Designation" button is pressed, a map window including a present position of the vehicle is displayed. A preferred area can be displayed by scrolling the window. Subsequently, a temporary road regulation data acquisition area can be designated by moving a cursor pointer on the window via the operation switch group 7 or the like.

Figure 14:
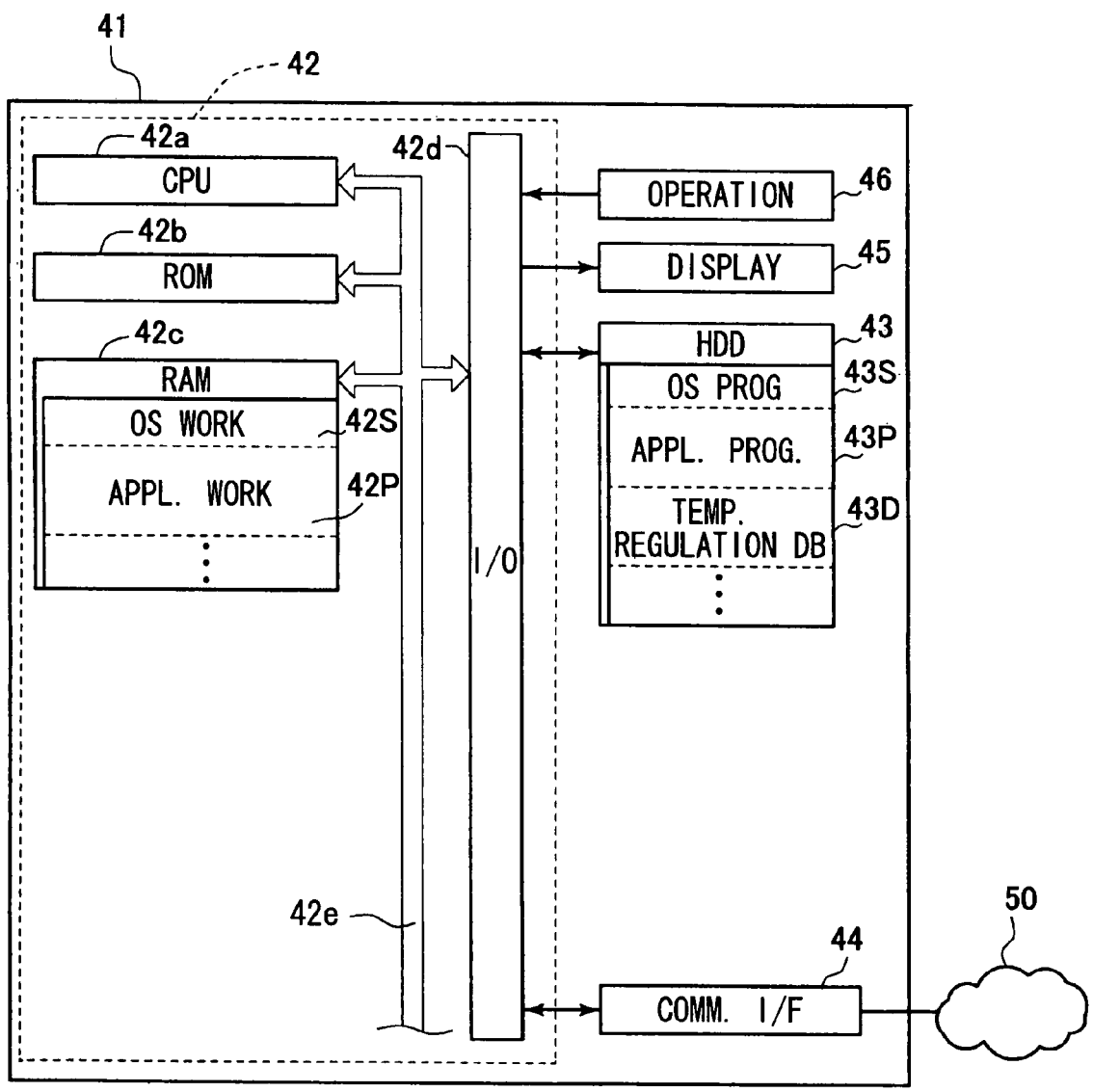
FIG. 14 is a diagram illustrating an example of a configuration of a data server.

FIG. 14 illustrates an example of a configuration of the data server 41. The data server 41 may be a well-known personal computer or workstation, which has a HDD (Hard Disk Drive) 43, a communication I/F (Interface) 44, a display unit 45, an operation unit 46, and a control circuit 42 connected with the foregoing components.

The HDD 43 stores an OS (Operating System) program 43S functioning as an OS for operating the data server 41, an application program 43P functioning as an application which works on the OS, and a temporary road regulation data table 43D.

The communication I/F 44 includes a network adaptor which has an interface function between a communication network such as the Internet 50.

The display unit 45 includes a liquid crystal display or a CRT display. The operation unit 46 includes a keyboard or a pointing device such as a mouse.

The control circuit 42 includes a CPU 42a, a ROM 42b, a RAM 42c, an input/output interface (I/O) 42d, and a bus line 42e connected with the foregoing components. The CPU 42a controls using the OS program 43S stored in the HDD 43. The OS program 43S is executed in an OS work area (e.g., work memory 42S) in the RAM 42c. Moreover, the application program 43P is executed in an application work area (e.g., work memory 42P) in the RAM 42c.

The temporary road regulation data table 43D stores all the temporary road regulation data in a whole country or a predetermined area and includes the same contents of those of the temporary road regulation data table TB2 in FIG. 3.

Figure 15:
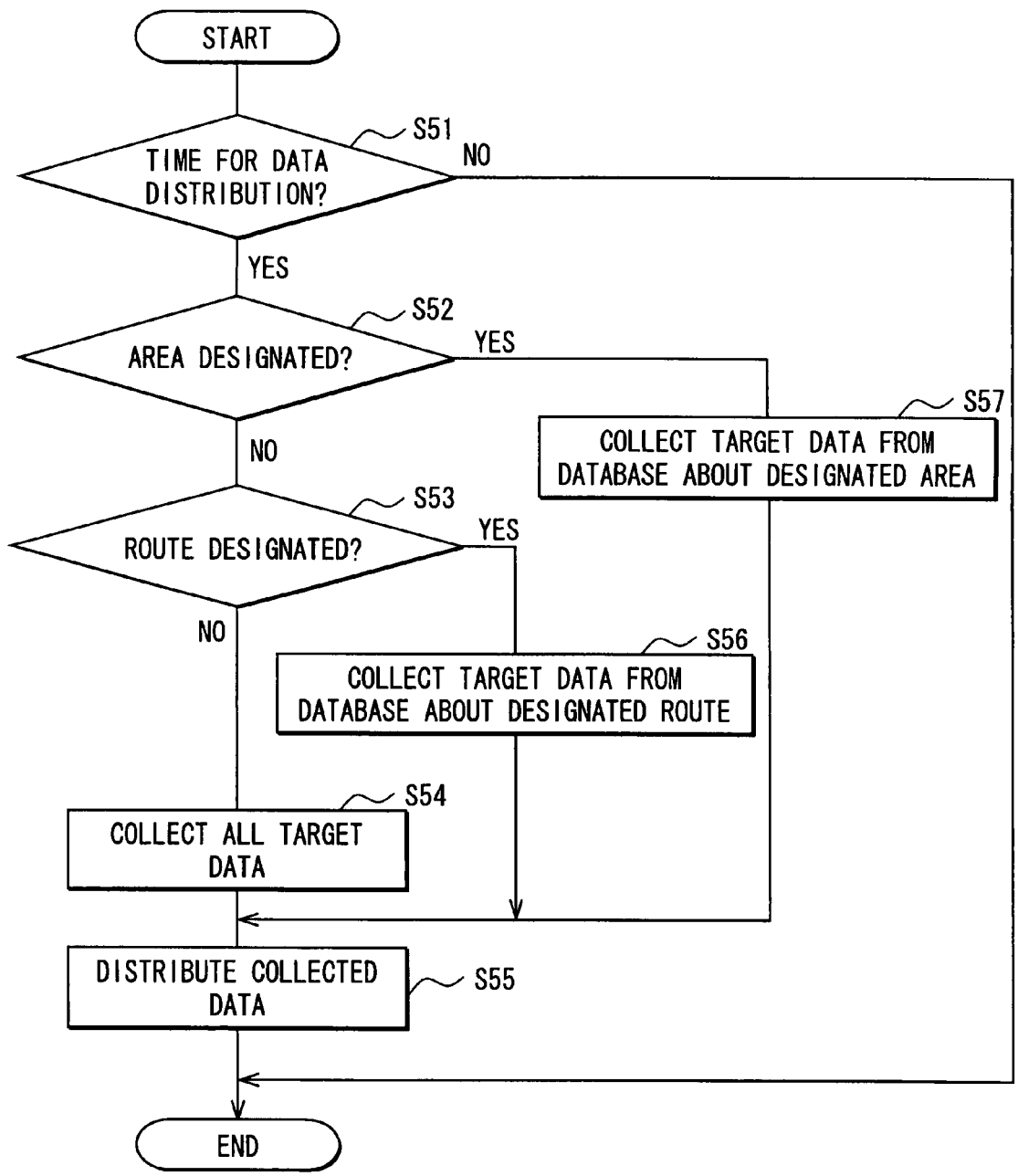
FIG. 15 is a flow chart explaining a temporary road regulation data distribution process.

A distribution process for the temporary road regulation data by the data server 41 is explained using FIG. 15. The present process is included in the application program 43P, and repeatedly executed along with other processes included in the application program 43P. First, it is investigated whether it is a time to distribute temporary road regulation data (S51). When it is a time for distributing temporary road regulation data (S51: Yes), the process proceeds to Step S52.

The time for distributing temporary road regulation data includes as follows:

(1) a time when the request is received from the user (navigation apparatus 100), or (2) a predetermined distribution time (e.g., once per week, once per month, once per three months).

An acquisition area of temporary road regulation data may be included in the transmission request from the user, or the distribution area of temporary road regulation data may be previously designated as a designation area in the data server 41 (S52: Yes). In this case, the temporary road regulation data table 43D is searched for temporary road regulation data included in the acquisition area or the designation area. A target of distribution is collected or retrieved which, for instance, is data having a period of regulation including the present date (S57).

In contrast, when no area is designated (S52: No), it is investigated whether the departure point, the destination, and the guide route are included in the transmission request from the user. When the departure point, the destination, and the guide route are included (S53: Yes) (e.g., when a route is designated), the temporary road regulation data table 43D is searched for temporary road regulation data on the designated route (namely, guide route). Thus, the temporary road regulation data as the target of distribution is collected (S56). Temporary road regulation data of a proximity of the guide route may also be retrieved or collected.

When no area or no route is designated (S53: No), all the temporary road regulation data in the temporary road regulation data table 43D is collected as a target of distribution (S54). The collected temporary road regulation data is distributed to the user (S55).

Figure 11:
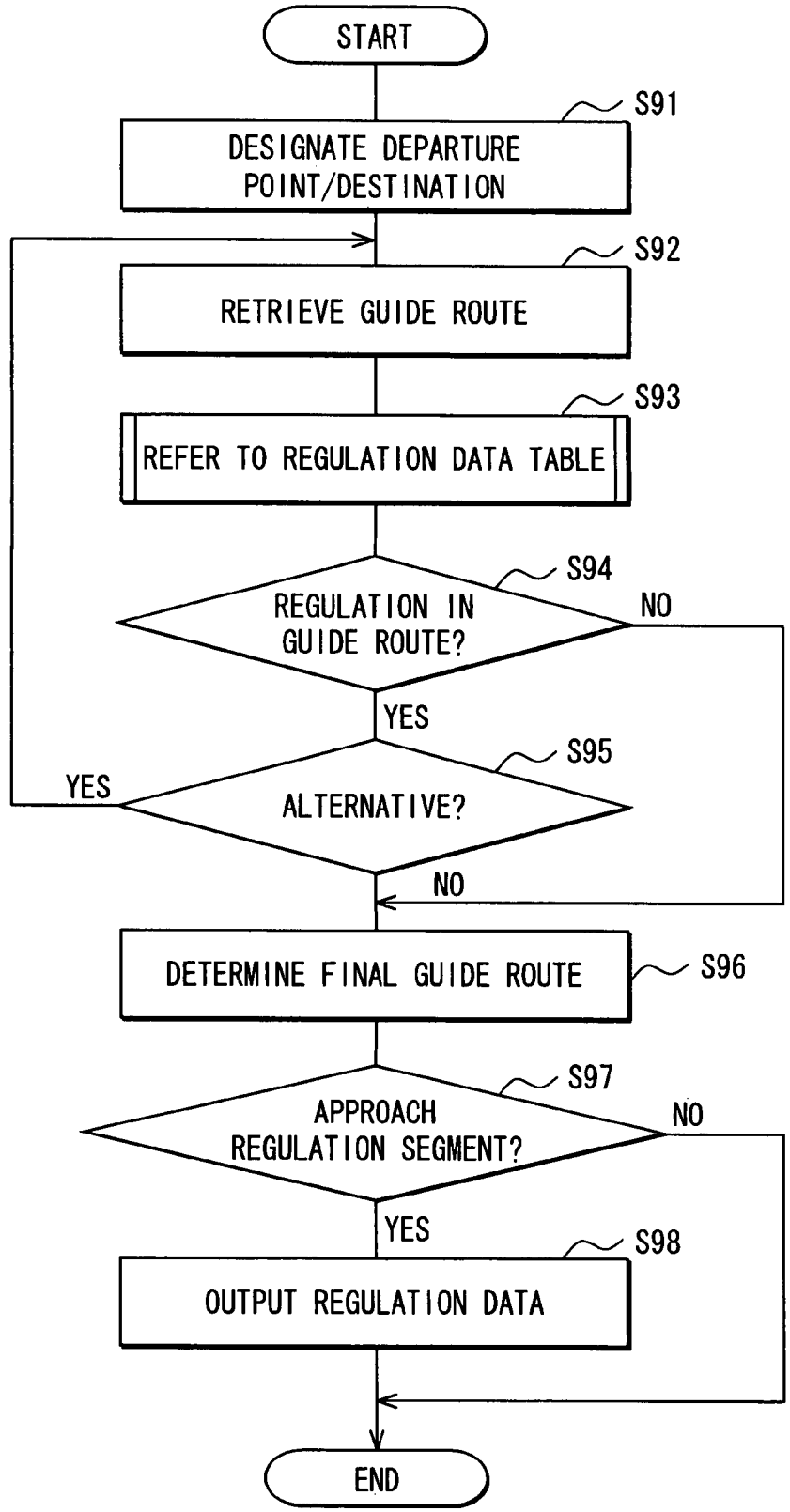
FIG. 11 is a flow chart of a route retrieval process using a road regulation data table.

A route retrieval process using the road regulation data table 21d1 is explained using FIG. 11. This process is included in the navigation program 21p, and repeatedly executed along with other processes included in the navigation program 21p. First, a departure point (or present position) and a destination are designated as mentioned above (S91). At this time, a date and time for a departure is inputted. If the date and time of the departure corresponds to the present time, input can be omitted. Next, a guide route is retrieved from the departure point to the destination in a well-known method (S92).

Next, it is investigated whether a regulation point is included in the guide route retrieved above (S93) with reference to the temporary road regulation data table TB2 and the additional data table TB3 in the road regulation data table 21d1.

Based on the date and time of the departure inputted previously and the retrieved guide route, it is first investigated in each segment of the guide route whether a data content which delays an arrival to the destinations such as no traffic, or construction is present with reference to the temporary road regulation data table TB2. Next, with reference to the additional data table TB3 in FIG. 3, it is investigated in each segment of the guide route, e.g., whether the guide route includes an intersection in which a right turn is to be indicated but only left turn is preferred by the user, or whether the guide route includes a segment such as a segment between Town M and Town N intended by the user to avoid passing through.

The estimated arrival time for each segment of the guide route can be calculated, e.g., based on a distance and travel speeds on a general road and a freeway. Here, a travel speed of 40 km/h is assigned for a general road; 80 km/h for a freeway. Moreover, when a speed limit is contained in the data content of the master road regulation data or temporary road regulation data, the estimated arrival time may be calculated by assigning the speed limit to a travel speed of the vehicle.

When the above regulation point or the segment to avoid passing through is included in the guide route (S94: Yes), and then when an alternative route is present (S95: Yes), a guide route is re-retrieved not to include the regulation point or the segment to avoid passing through (S92).

In contrast, when the above regulation point or the segment to avoid passing through is not included in the guide route (S94: No), or when an alternative route (e.g., detour) is not present (S95: No), the guide route is determined as a final guide route (S96).

Then, when a present position detected by the position detection unit 1 approaches within a range from the above regulation point or the segment to avoid passing through during the route guide (S97: Yes), the data content of the road regulation data is outputted via the display unit 10 or the speaker 15 (refer to S98, FIG. 13).

Figure 12:
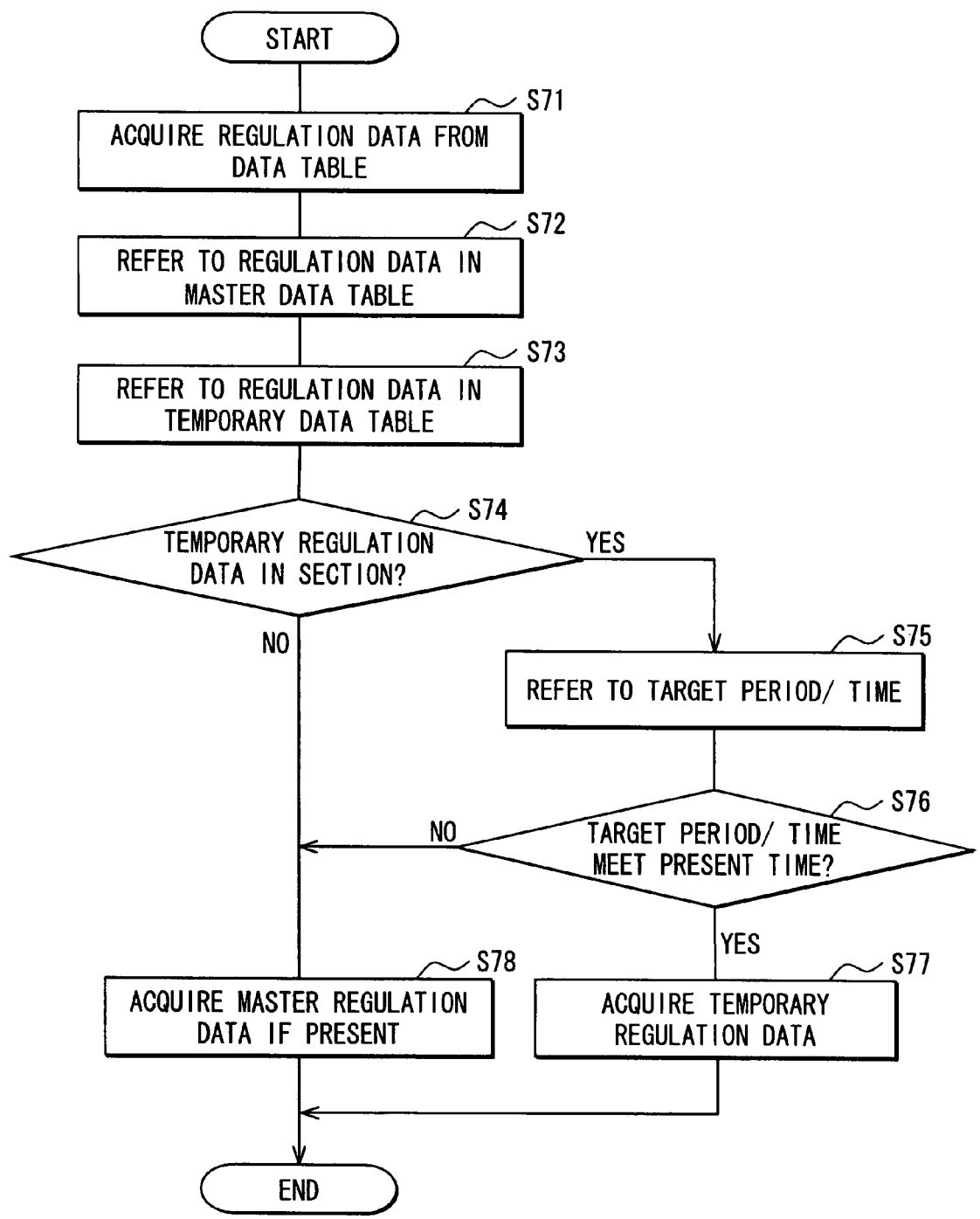

A process corresponding to Step S93 for referring to the temporary road regulation data is explained using FIG. 12. First, a present position of the vehicle is acquired from the position detection unit 1, and the road regulation data table 21d1 (i.e., the master road regulation data table TB1, the temporary road regulation data table TB2, and the additional data table TB3) is referred to based on the acquired present position. Thus, the road regulation data relating to a road ahead (e.g., 2 km) of the present position is acquired (S71).

If the acquired road regulation data is included in the master road regulation data, the data is stored in the RAM 83 etc. (S72).

Next, it is investigated whether the acquired road regulation data is included in the temporary road regulation data (S73). When the acquired road regulation data is included in the temporary road regulation data (S74: Yes), it is investigated whether the present date and time is contained in the period (target period) and the time (e.g., hours or time zone) (target time) of the temporary road regulation data based on the date and time information acquired from the clock IC 88 (S75).

When the present date and time is contained in the target period and target time (S76: Yes), the temporary road regulation data is acquired or taken in as guide information (S77).

In contrast, when the present date and time is not contained in the target period and target time (S76: No), the master road regulation data, if existing, is acquired or taken in as guide information (S78).

Figure 13:
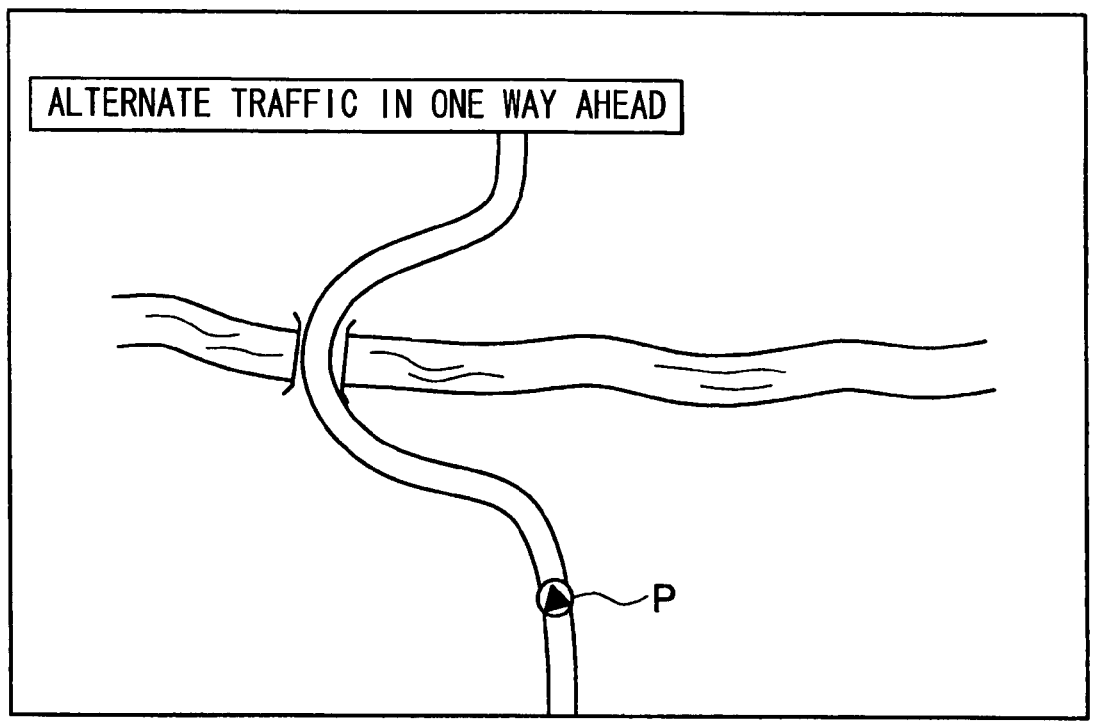
FIG. 13 is a view illustrating an example of a display window for a temporary road regulation data output.

An example of an output of the guide information is illustrated in FIG. 13. The example of FIG. 13 indicates that there is an alternate traffic in one way ahead of the present position P of the vehicle. In the master road regulation data, an alternate traffic in one way may be not included. In this case, it is supposed that one of the two traffic directions is impassable because of a repairing work, an accident, or a natural disaster such as a falling stone. Thus, the user can prepare a countermeasure to sufficiently anticipate the state, before reaching the point.

Figure 16:
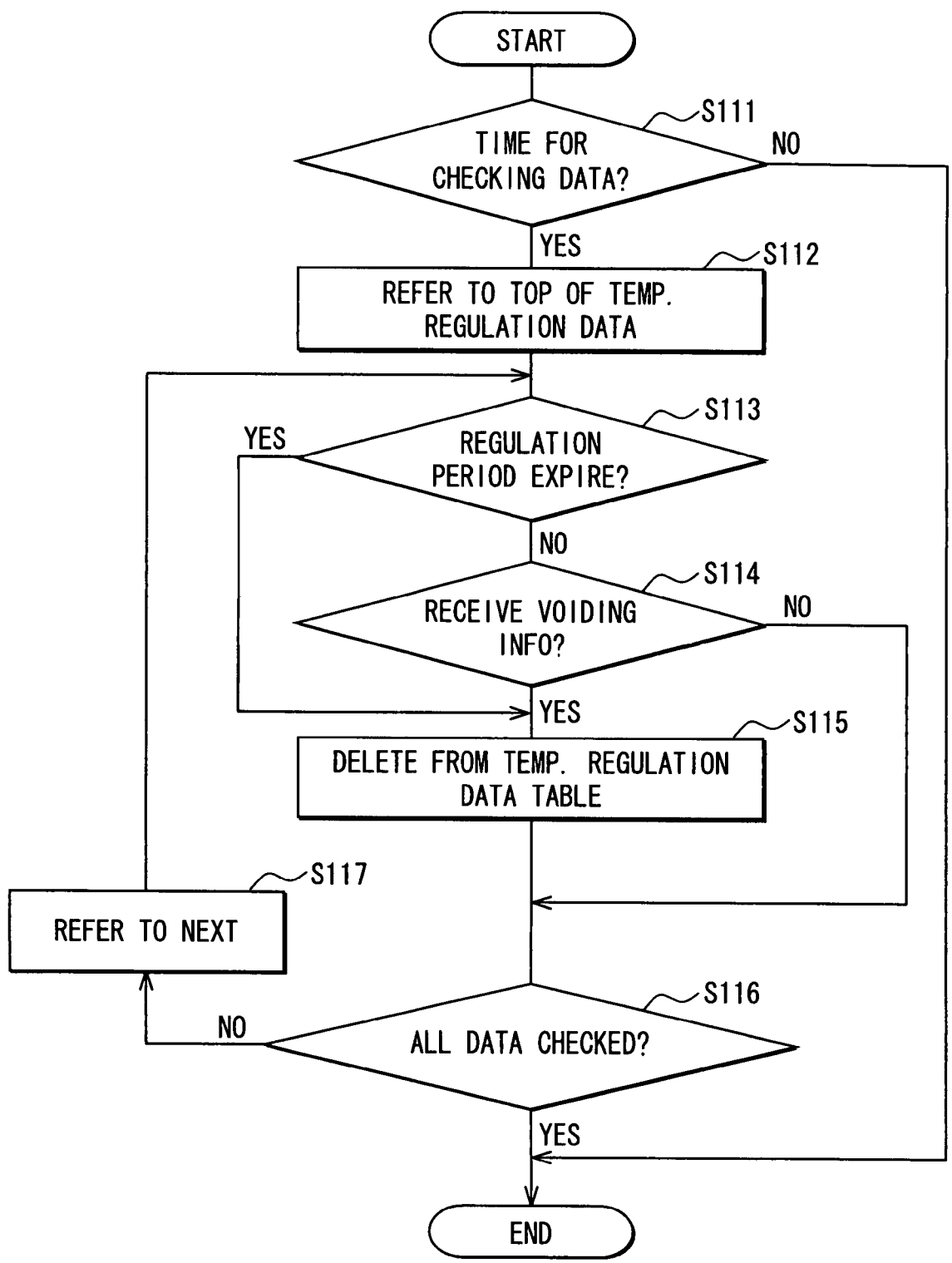
FIG. 16 is a flow chart explaining a temporary road regulation data deletion process.

A deletion process of temporary road regulation data is explained using FIG. 16. This process is included in the navigation program 21p, and repeatedly executed along with other processes included in the navigation program 21p. First, it is investigated whether it is a time for checking for the temporary road regulation data. The time for checking is previously designated and includes, e.g., each time the navigation apparatus 100 starts, 00 minutes every hour, or twelve midnight every day. Moreover, the time for checking may be set by a user. The set data content is stored in the memory device 9 or HDD 21.

When it is the time for checking (S111: Yes), a top temporary road regulation data item is referred to in the temporary road regulation data table TB2 (S112). With reference to the period and time zone of the corresponding regulation, it is then investigated whether or not the period and time referred to expire by comparing with the present date and time acquired from the clock IC 88. When the period and time expires (S113: Yes), the corresponding temporary road regulation data is deleted from the temporary road regulation data table TB2 (S115).

Further, when voiding information for undetermined period validity information is received (S114: Yes), the corresponding temporary road regulation data is deleted from the temporary road regulation data table TB2 (S115).

The undetermined period validity information is information indicating that the termination date of the temporary road regulation is valid as being undetermined. For example, the undetermined period validity information can be received when a natural disaster such as mudslide occurring to close the traffic and require a time to recover. That is, the undetermined period validity information is exemplified in the temporary road regulation data about National Road Q in the temporary road regulation data table TB2 in FIG. 3. In this case, the period is "Until Recovery" indicating that the period is undetermined. The voiding information for the undetermined period validity information is for voiding or canceling the undetermined period validity information. For instance, in FIG. 3, the voiding information with respect to National Road Q can be information indicating a recovery completion or a scheduled recovery completion date.

When the voiding information "recovery completion" with respect to National Road Q is received or inputted (or when stored in the receive data buffer or the input data buffer), the temporary road regulation data about National Road Q is deleted from the temporary road regulation data table TB2 in FIG. 3.

In addition, the deletion process for the temporary road regulation data may be included in Step S15 in the road regulation data input process in FIG. 4, or Step S36 in FIG. 6.

The above Steps S113 to S115 are executed for all the temporary road regulation data stored in the temporary road regulation data table TB2 (S116: No, and S117).

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

According to a first aspect, a navigation apparatus for a vehicle is provided as follows. A road map data storage unit is configured to store road map data. A road regulation data storage unit is configured to store master road regulation data table and temporary road regulation data table. The master road regulation data table includes master road regulation data to be associated with road segments in the road map data. The temporary road regulation data table is independent from the master road regulation data table and includes temporary road regulation data to be associated with a predetermined road segment included in the road segments. The temporary road regulation data is applied in preference to the master road regulation data. A reference information acquisition unit is configured to acquire reference information for determining which of the master road regulation data and the temporary road regulation data is valid with respect to one of the road segments as a target road segment. A data determination unit is configured to determine an application of either the master road regulation data or the temporary road regulation data to the target road segment based on the acquired reference information. A road regulation data output unit is configured to output either the master road regulation data or the temporary road regulation data of which the application is determined.

In the above structure, in addition to usual road regulation data such as a speed limit, the navigation apparatus stores temporary road regulation data to follow temporary regulation changes for a limited application period depending on a road maintenance state due to weather or road construction actually taking place. Thus, guides for road regulations or safety speeds can be provided to meet road states actually taking place.

With the conventional technology, the master road regulation data may be rewritten also with the temporary road regulation data applied temporarily. Even if the application period of the temporary road regulation data expires, the subsequent new road regulation data may be not acquired. In this case, control is executed based on the temporary road regulation data which has expired. In the present configuration, valid road regulation data can be chosen and outputted from multiple road regulation data based on the actual road state. This allows constant output of suitable road regulation data; further, it is less indispensable for a user to perform a manual input.

The road map data storage unit can be included in the memory device 9 or the HDD 21. The road regulation data storage unit can be included in the database 21*d* of the HDD 21. The reference information acquisition unit can be included in the control circuit 8. The data determination unit can be included in the control circuit 8. The road regulation data output unit can be included in the display unit 10 or the speaker 15.

Further, if, with respect to the target road segment, the master road regulation data is present and the temporary road regulation data is determined to be valid, the temporary road regulation data may be determined to be substituted for the master road regulation data and applied to the target road segment.

In other words, if the temporary road regulation data does not exist, the master road regulation data is used. Thus, the proper road regulation data can be provided to perform the guides for the road regulations or safety speeds to the user.

Further, if, with respect to the target road segment, the master road regulation data is not present and the temporary road regulation data is determined to be valid, the temporary road regulation data may be determined to be applied to the target road segment as new road regulation data.

Thus, even if the master road regulation data is not present, as long as the temporary road regulation data is valid, the valid temporary road regulation data can be outputted. Thus, guides for road regulations or safety speeds can be provided to meet road states actually taking place.

Further, the reference information may indicate an application period for the temporary road regulation data with respect to the target road segment; the reference information may be stored to be associated with the temporary road regulation data with respect to the target road segment. The data determination unit may include a present date and time acquisition unit to acquire a present date and time. The data determination unit may (i) perform a comparison of the acquired present date and time with the application period included in the reference information for the temporary road regulation data with respect to the target road segment, and (ii) determine an application of either the master road regulation data or the temporary road regulation data to the target road segment based on a result from the comparison.

That is, if a present time (i.e., present date and time) is contained within the application period of the temporary road regulation data, the temporary road regulation data is used; If the present time is not contained within the application period of the temporary road regulation data, the master road regulation data is used. Thus, guides for road regulations or safety speeds can be constantly provided based on the appropriate road regulation data. The present date and time acquisition unit can be included in the clock IC 88, the GPS receiver 5, or the control circuit 8.

Further, the reference information may be stored to be associated with the temporary road regulation data with respect to the target road segment, and may include validity information indicating that the temporary road regulation data with respect to the target road segment is valid with an application period being undetermined. If, with respect to the target road segment, the temporary road regulation data is present and accompanied by the validity information, the data determination unit may determine the application of the temporary road regulation data.

For example, certain temporary road regulation data relative to a certain road segment includes "NO TRAFFIC when a continuous rainfall exceeds 100 mm." In this case, the validity period of the certain temporary road regulation data is supposed to be suspended or undetermined. The certain temporary road regulation data can be applied regardless of the present time. Thus, the guides for the road regulations or safety speeds can be provided to the user based on the proper road regulation data.

Further, a temporary road regulation data acquisition unit may be further included to wirelessly acquire the temporary road regulation data from an outside of the vehicle.

Thus, the temporary road regulation data can be acquirable in real time by receiving the data via the communications using a transmitter as the temporary road regulation data acquisition unit provided along the road side, for example. Moreover, since the user does not need to manually input temporary road regulation data, operation loads do not increase. Even if the user inputs temporary road regulation data, the user may does not travel the route including the road having the temporary road regulation data. Even in this case, the temporary road regulation data for a new route can be acquirable. This allows constant output of suitable road regulation data. The temporary road regulation data acquisition unit can be included in the communication unit 25.

Further, a temporary road regulation data input unit may be further included to input the temporary road regulation data.

In the above configuration, the temporary road regulation data can be inputted beforehand, for example, when data content of the temporary road regulation data is understood before the travel. Moreover, even if a transmitter to transmit temporary road regulation data is not located along a road the vehicle travels, it is possible to input new road regulation data. Thus, guides for road regulations or safety speeds can be constantly provided based on the appropriate road regulation data. The temporary road regulation data input unit can be included in the operation switch group 7, the remote control sensor 11, or the touch panel 22.

Further, a temporary road regulation data acquisition area designation unit may be further included to designate an acquisition area of the temporary road regulation data in the road map data. The temporary road regulation data acquisition unit may acquire the temporary road regulation data based on the designated temporary road regulation data acquisition area.

In this configuration, it is possible to acquire, for a short time, only the temporary road regulation data necessary for the user. This can prevent the storage capacity from being pressed because of reception of the unnecessary temporary road regulation data. The temporary road regulation data acquisition area designation unit can be included in the control circuit 8.

Further, a position detection unit may be further included to detect a present position of the vehicle. The temporary road regulation data acquisition area designation unit may designate a predetermined area including the detected present position as the temporary road regulation data acquisition area.

When the vehicle is running, the temporary road regulation data necessary for the user is frequently related to a proximity of the present position of the vehicle. In the just above configuration, it is possible to acquire, for a short time, only the temporary road regulation data necessary for the user. This can prevent the storage capacity from being pressed because of reception of the unnecessary temporary road regulation data.

Further, a guide route retrieval unit may be further included to retrieve a guide route to a destination. The temporary road regulation data acquisition area designation unit may designate a predetermined area including the retrieved guide route as the temporary road regulation data acquisition area.

When the vehicle travels along a guide route, the temporary road regulation data necessary for the user may be related to a proximity along the guide route. In the just above configuration, it is possible to acquire, for a short time, only the temporary road regulation data necessary for the user even when a guide route is designated. Similarly, this can prevent the storage capacity from being pressed because of reception of the unnecessary temporary road regulation data. The guide route retrieval unit can be included in the control circuit 8.

According to a second aspect, a method is provided for determining an application of road regulation data using road map data for a vehicle. The method comprises: (i) storing master road regulation data to be associated with road segments in the road map data; (ii) storing the temporary road regulation data to be associated with a predetermined road segment included in the road segments, the temporary road regulation data being applied in preference to the master road regulation data; (iii) acquiring reference information for determining which of the master road regulation data and the temporary road regulation data is valid with respect to one of the road segments as a target road segment; and (iv) determining an application of either the master road regulation data or the temporary road regulation data to the target road segment based on the acquired reference information.

In the second aspect, an advantage can be provided in similarity with that of the first aspect.

It will be obvious to those skilled in the art that various changes may be made in the above-described embodiments of the present invention. However, the scope of the present invention should be determined by the following claims.

What is claimed is:

1. A navigation apparatus for a vehicle, the apparatus comprising:
    a road map data storage unit configured to store road map data;
    a road regulation data storage unit configured to store master road regulation data table and temporary road regulation data table,
        the master road regulation data table including master road regulation data to be associated with road segments in the road map data,
        the temporary road regulation data table being independent from the master road regulation data table and including temporary road regulation data to be associated with a predetermined road segment included in the road segments, the temporary road regulation data being applied in preference to the master road regulation data;
        the temporary road regulation data table further including reference information in association with the temporary road regulation data for determining which of the master road regulation data and the temporary road regulation data is valid with respect to one of the road segments as a target road segment, the reference information indicating an application period for the temporary road regulation data with respect to the target road segment;

a data determination unit configured to determine an application of either the master road regulation data or the temporary road regulation data to the target road segment based on the reference information stored in the temporary road regulation data table; and a road regulation data output unit configured to output either the master road regulation data or the temporary road regulation data of which the application is determined, wherein the data determination unit includes a present date and time acquisition unit to acquire a present date and time; and the data determination unit (i) performs a comparison of the acquired present date and time with the application period included in the reference information for the temporary road regulation data with respect to the target road segment, and (ii) determines an application of either the master road regulation data or the temporary road regulation data to the target road segment based on a result from the comparison.

2. The navigation apparatus of claim 1, wherein if, with respect to the target road segment, the master road regulation data is present and the temporary road regulation data is determined to be valid, the temporary road regulation data is determined to be substituted for the master road regulation data and applied to the target road segment.

3. The navigation apparatus of claim 1, wherein if, with respect to the target road segment, the master road regulation data is not present and the temporary road regulation data is determined to be valid, the temporary road regulation data is determined to be applied to the target road segment as new road regulation data.

4. The navigation apparatus of claim 1, wherein:

the temporary road regulation data follow a temporary regulation change for a limited application period.

5. The navigation apparatus of claim 1, wherein:

the reference information, which is stored to be associated with the temporary road regulation data with respect to the target road segment, includes validity information indicating that the temporary road regulation data with respect to the target road segment is valid along with the application period of the temporary road regulation data with respect to the target road segment, the application period indicated as being undetermined; and if, with respect to the target road segment, the temporary road regulation data is present and accompanied by the validity information, the data determination unit determines the application of the temporary road regulation data.

6. The navigation apparatus of claim 1, further comprising:

a temporary road regulation data acquisition unit configured to wirelessly acquire the temporary road regulation data along with the reference information from an outside of the vehicle.

7. The navigation apparatus of claim 1, further comprising:

a temporary road regulation data input unit configured to input the temporary road regulation data along with the reference information.

8. The navigation apparatus of claim 7, further comprising:

a temporary road regulation data acquisition area designation unit configured to designate an acquisition area of the temporary road regulation data in the road map data, wherein the temporary road regulation data acquisition unit acquires the temporary road regulation data based on the designated temporary road regulation data acquisition area.

9. The navigation apparatus of claim 8, further comprising:

a position detection unit configured to detect a present position of the vehicle, wherein the temporary road regulation data acquisition area designation unit designates a predetermined area including the detected present position as the temporary road regulation data acquisition area.

10. The navigation apparatus of claim 8, further comprising:

a guide route retrieval unit configured to retrieve a guide route to a destination, wherein the temporary road regulation data acquisition area designation unit designates a predetermined area including the retrieved guide route as the temporary road regulation data acquisition area.

11. The navigation apparatus of claim 1, further comprising:

means for accepting, from a user, preference information to avoid passing through a certain road segment along with associated reference information for indicating a predetermined application period, wherein with respect to the certain road segment the user has a recognition, within the predetermined application period, the recognition signifying that it is difficult to make a turn to a certain direction or it is preferable to avoid passing through, wherein:

the temporary regulation data table further includes the preference information of the user accepted via the means for accepting; and the data determination unit is further configured to determine an application of either the master road regulation data or the preference information to the target road segment based on the associated reference information stored in the temporary road regulation data table.

12. The navigation apparatus of claim 1, wherein the temporary regulation data includes a road status relating to at least one of a closure due to weather or disaster and a construction actually taking place while an application period of the road status is indicated as being undetermined.

13. The navigation apparatus of claim 1, further comprising:

means for obtaining new temporary road regulation data; and means for investigating whether there is a conflict between the temporary road regulation data, which is stored in the road regulation data storage unit, and the new temporary road regulation data by comparing with each other, wherein the conflict exists when a first condition or a second condition takes place, the first condition signifying that an application period of one road regulation and an application period of an other road regulation overlap at least in part, and a data content of the one road regulation is different from a data content of the other road regulation, the second condition signifying that one road segment and an other road segment are different at least in part while a data content of a road regulation of the one road segment is identical with a data content of the road regulation of the other road segment.

14. A method for determining an application of road regulation data using road map data for a vehicle, the method comprising:

storing master road regulation data to be associated with road segments in the road map data;

storing temporary road regulation data to be associated with a predetermined road segment included in the road segments, the temporary road regulation data being applied in preference to the master road regulation data;

storing reference information to be associated with the temporary road regulation data with respect to the target road segment for determining which of the master road regulation data and the temporary road regulation data is valid with respect to one of the road segments as a target road segment, the reference information indicating an application period for the temporary road regulation data with respect to the target road segment;

determining an application of either the master road regulation data or the temporary road regulation data to the target road segment based on the stored reference information;

acquiring a present data and time; and (i) performing a comparison of the acquired present date and time with the application period included in the reference information for the temporary road regulation data with respect to the target road segment, and (ii) determining and application of either the master road regulation data or the temporary road regulation data to the target road segment based on a result from the comparison.

15. The method according to claim 14, further comprising:

accepting, from a user, preference information to avoid passing through a certain road segment along with associated reference information for indicating a predetermined application period, wherein with respect to the certain road segment the user has a recognition, within the predetermined application period, the recognition signifying that it is difficult to make a turn to a certain direction or it is preferable to avoid passing through; and storing the accepted preference information in association with the associated reference information, wherein in the determining, an application of either the master road regulation data or the preference information to the target road segment is determined based on the reference information associated with the preference information.

16. The method according to claim 14, wherein the temporary regulation data includes a road status relating to at least one of a closure due to weather or disaster and a construction actually taking place while an application period of the road status is indicated as being undetermined.

17. The method according to claim 14, further comprising:

obtaining new temporary road regulation data; and investigating whether there is a conflict between the temporary road regulation data, which is previously stored, and the new temporary road regulation data by comparing with each other, wherein the conflict exists when a first condition or a second condition takes place, the first condition signifying that an application period of one road regulation and an application period of an other road regulation overlap at least in part, and a data content of the one road regulation is different from a data content of the other road regulation, the second condition signifying that one road segment and an other road segment are different at least in part while a data content of a road regulation of the one road segment is identical with a data content of the road regulation of the other road segment.

* * * * *